US012374319B2

(12) United States Patent
Ding et al.

(10) Patent No.: US 12,374,319 B2
(45) Date of Patent: Jul. 29, 2025

(54) SPEECH SYNTHESIS METHOD, DEVICE AND COMPUTER-READABLE STORAGE MEDIUM

(71) Applicant: UBTECH ROBOTICS CORP LTD, Shenzhen (CN)

(72) Inventors: Wan Ding, Shenzhen (CN); Dongyan Huang, Shenzhen (CN); Zhiyuan Zhao, Shenzhen (CN); Zhiyong Yang, Shenzhen (CN)

(73) Assignee: UBTECH ROBOTICS CORP LTD, 143 (CN)

( * ) Notice: Subject to any disclaimer, the term of this patent is extended or adjusted under 35 U.S.C. 154(b) by 321 days.

(21) Appl. No.: 18/089,576

(22) Filed: Dec. 28, 2022

(65) Prior Publication Data

US 2023/0206895 A1 Jun. 29, 2023

(30) Foreign Application Priority Data

Dec. 28, 2021 (CN) ......................... 202111630461.3

(51) Int. Cl.
*G10L 13/047* (2013.01)
*G10L 13/10* (2013.01)

(52) U.S. Cl.
CPC ............ *G10L 13/047* (2013.01); *G10L 13/10* (2013.01)

(58) Field of Classification Search
None
See application file for complete search history.

(56) References Cited

U.S. PATENT DOCUMENTS 9,613,617 B1 * 4/2017 Ludwig ................. G10L 19/167
2020/0066253 A1 * 2/2020 Peng ....................... G06F 17/18
(Continued)

FOREIGN PATENT DOCUMENTS

CN 112951203 A * 6/2021 ........... G10L 13/047
WO WO-2018159403 A1 * 9/2018 ............ G10L 13/02

OTHER PUBLICATIONS

Prenger R, Valle R, Catanzaro B. Waveglow: A flow-based generative network for speech synthesis[C]/ICASSP 2019-2019 IEEE International Conference on Acoustics, Speech and Signal Processing (ICASSP). IEEE, 2019: 3617-3621.
(Continued)

*Primary Examiner* — Daniel C Washburn
*Assistant Examiner* — Tyler Becker

(57) ABSTRACT

A speech synthesis method includes: obtaining an acoustic feature sequence of a text to be processed; processing the acoustic feature sequence by using a non-autoregressive computing model in parallel to obtain first audio information of the text to be processed, wherein the first audio information comprises audio corresponding to each segment; processing the acoustic feature sequence and the first audio information by using an autoregressive computing model to obtain a residual value corresponding to each segment; and obtaining second audio information corresponding to an i-th segment based on the first audio information corresponding to the i-th segment and the residual values corresponding to a first to an (i−1)-th segment, wherein a synthesized audio of the text to be processed comprises each of the second audio information, i=1, 2 . . . n, n is a total number of the segments.

20 Claims, 5 Drawing Sheets

(56) References Cited

U.S. PATENT DOCUMENTS

| | | | | |
|---|---|---|---|---|
| 2020/0265829 | A1* | 8/2020 | Liu | G10L 13/033 |
| 2020/0410976 | A1* | 12/2020 | Zhou | G06N 3/048 |

OTHER PUBLICATIONS

Valin J M, Skoglund J. LPCNet: Improving neural speech synthesis through linear prediction[C]/ICASSP 2019-2019 IEEE International Conference on Acoustics, Speech and Signal Processing (ICASSP). IEEE, 2019: 5891-5895.

Kalchbrenner N, Elsen E, Simonyan K, et al. Efficient neural audio synthesis[J]. arXiv preprint arXiv:1802.08435, 2018.

* cited by examiner

SPEECH SYNTHESIS METHOD, DEVICE AND COMPUTER-READABLE STORAGE MEDIUM

CROSS REFERENCE TO RELATED APPLICATIONS

This application claims priority to Chinese Patent Application No. CN 202111630461.3, filed Dec. 28, 2021, which is hereby incorporated by reference herein as if set forth in its entirety

BACKGROUND

1. Technical Field

The present disclosure generally relates to text to speech synthesis, and particularly to a speech synthesis method, device, and a computer-readable storage medium.

2. Description of Related Art

Text to speech synthesis is a technology which accepts text as input, and creates an appropriate speech signal as output.

In speech synthesis, vocoder is the module that takes the acoustic features as input and predicts the speech signal. Autoregressive and Non-autoregressive are two main kinds of the vocoders. Autoregressive vocoders are based on recurrent architectures and can be lightweight (e.g., wavernn, lpcnet). Non-autoregressive vocoders are based on feedfoward architectures and can be faster but usually larger (e.g., HiFiGAN, WaveGlow). Therefore, there is a need for a method that can provide lightweight, fast and high-quality speech synthesis system.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals desipate corresponding parts throughout the several views.

DETAILED DESCRIPTION

Figure 1:
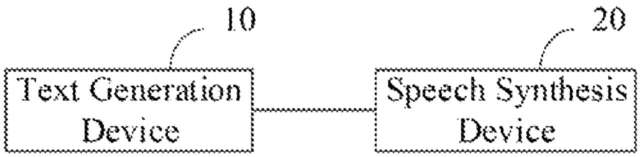
FIG. 1 is a schematic block diagram of a system for implementing a speech synthesis method according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Vocoders include autoregressive models and non-autoregressive models. Non-autoregressive models are fast, but the model sizes are usually large. The autoregressive models can be lightweight but the inference time cost is relatively higher.

According to the embodiments of the present disclosure: a) the input acoustic feature sequence is segmented based on the prosodic pauses, e.g., to the segments corresponding to words; b). a non-autoregressive model is used to predict the speech signal for each word in parallel; c) a less-than-ideal quality audio is then generated by combining the word-level speech signals together; d) an autoregressive model is used to predict the residual (between the less-than-ideal quality and the groundtruth) of the audio. By combining the non-autoregressive model and the autoregressive model, the model size is smaller than using only the non-autoregressive model, and it is faster than the audio generated using only the autoregressive model.

The principle of vocoder in the embodiments of the present disclosure is as follows:

$$p\left(\frac{\overline{X}}{m}\right)=\prod p\left(\frac{x_i}{m}\right),$$

where $X=[x_1, x_2, \ldots x_{n-1}, x_n]$ denotes the audio to be synthesized, m denotes the input acoustic feature sequence and $x_i$ denotes the $i^{th}$ segment of the audio; $\overline{X}$ is the estimated value of X predicted by the parallel model;

$$p\left(\frac{x_i}{m}\right)$$

is the probability of the value of the i-th audio segment conditioned on the known value m, $0 \le i \le n$, based on independent preset conditions;

$$p\left(\frac{x_i}{m}\right)$$

can be processed in parallel. Finally, sampling is performed according to the probability to obtain the estimated value of the audio (i.e., the first audio information).

$$p\left(\frac{\overline{X}}{m}\right)$$

in the equation above is the first audio information obtained by using the parallel computing model. Another equation is $$p\left(\frac{X}{m}\right)=\prod_{t=1}^{n} p\left(\frac{x_t}{(x_{[1:t-1]}, m), \overline{x}}\right),$$

where $$p\left(\frac{X}{m}\right)$$

is the second audio information (the residual) obtained by using the autoregressive model; $(x_{[1:t-1]}, m)$ is the second audio information of the (t−1)th segment and m is the acoustic feature; $\bar{x}$ is the first audio information pred;

$$p\left(\frac{x_t}{(x_{[1:t-1]}, m), \bar{x}}\right)$$

is the probability of the value of the t-th segment conditioned on the previous residual prediction results, the acoustic features and the first audio information.

FIG. 1 shows an exemplary system for implementing a speech synthesis method for converting text into speech. The system may include a text generation device 10 and a speech synthesis device 20. The text generation device 10 is to generate text. The speech synthesis device 20 is to obtain text from the text generation device 10, and process the text through a computing model to generate the speech signal.

Figure 2:
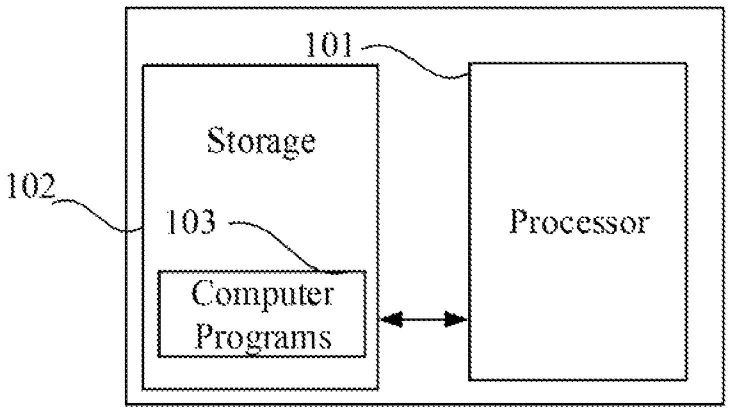
FIG. 2 is a schematic block diagram of a device for speech synthesis according to one embodiment.
Figure 3:
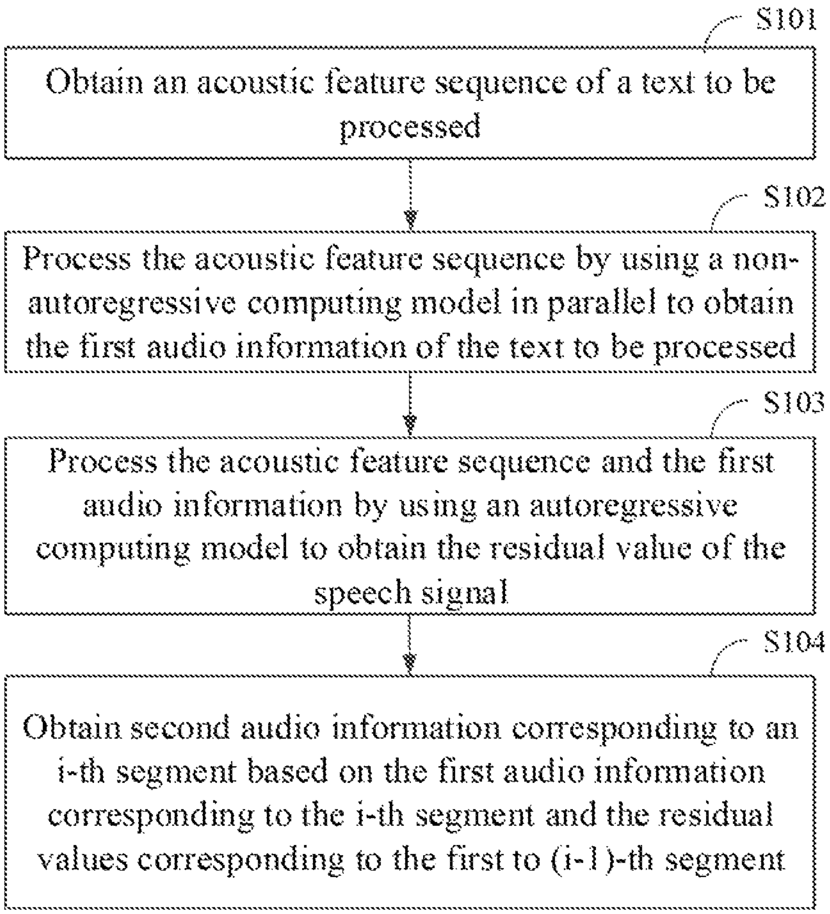
FIG. 3 is an exemplary flowchart of a speech synthesis method according to one embodiment.

FIG. 2 shows a schematic block diagram of the device for speech synthesis according to one embodiment. The device may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of the method for controlling the device, such as steps S101 to S104 in FIG. 3, are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the device, such as a hard disk or a memory. The storage 102 may also be an external storage device of the device, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the device. The storage 102 can also be used to temporarily store data that have been output or is about to be output.

Figure 5:
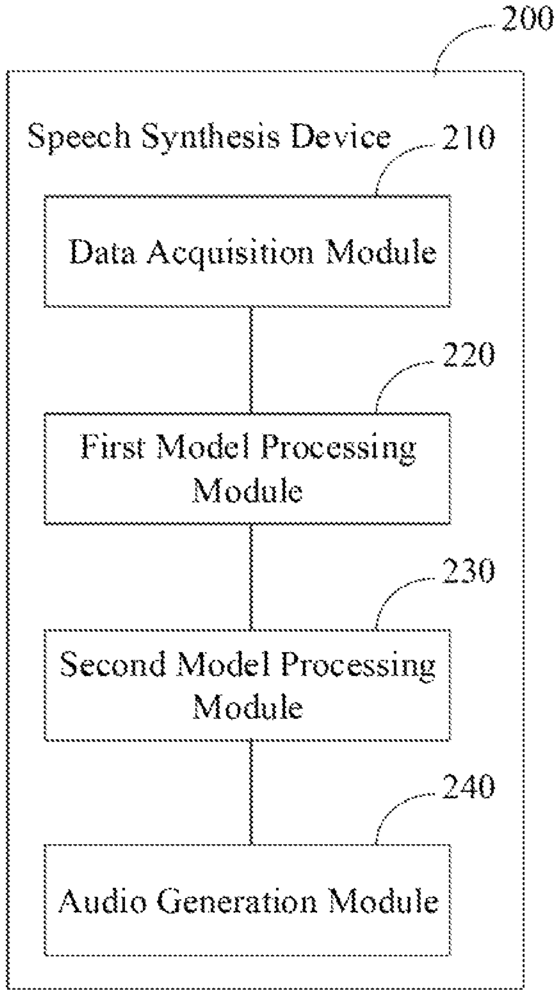
FIG. 5 is a schematic block diagram of a speech synthesis device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the device. For example, the one or more computer programs 103 may be divided into a data acquisition module 210, a first model processing module 220, a second model processing module 230 and an audio generation module 240 as shown in FIG. 5.

It should be noted that the block diagram shown in FIG. 2 is only an example of the device. The device may include more or fewer components than what is shown in FIG. 2, or have a different configuration than what is shown in FIG. 2. Each component shown in FIG. 2 may be implemented in hardware, software, or a combination thereof.

Referring to FIG. 3, in one embodiment, a speech synthesis method may include the following steps.

Step S101: Obtain an acoustic feature sequence of a text to be processed.

In one embodiment, an electronic device can be used to acquire the acoustic feature sequence of the text to be processed from an external device. For example, the electronic device can also obtain the text to be processed from the external device, and extract the acoustic feature sequence from the obtained text to be processed. Alternatively, the electronic device can obtain information input by the user, and generate text to be processed according to the information input by the user. The electronic device may be a vocoder, a computer, or the like.

In one embodiment, the electronic device may use an acoustic feature extraction model to obtain the acoustic feature sequence of the text to be processed. The acoustic feature extraction model can be a convolutional neural network model, a recurrent neural network, and the like.

In one embodiment, the acoustic feature sequence may include a Mel spectrogram or a Mel-scale Frequency Cepstral. Coefficients.

Step S102: Process the acoustic feature sequence by using a non-autoregressive computing model in parallel to obtain the first audio information of the text to be processed.

In one embodiment, the first audio information is the combination of the audio segments predicted by the non-autoregressive model in parallel. The segments can be defined as single word, or sub-sequences of words that has similar character lengths.

In one embodiment, the non-autoregressive computing model may be a parallel neural network model, for example, Wave GAN and Wave Glow.

Step S103: Process the acoustic feature sequence and the first audio information by using an autoregressive computing model to obtain the residual value of the speech signal.

In one embodiment, the autoregressive computing model may be LPCNet or WaveRNN. Since the autoregressive computing model is mainly used to calculate the residual values, the structure of the autoregressive computing model is relatively simple and the processing speed is relatively fast. The autoregressive computing model processes data step by step, and each step of the autoregressive computing model needs to use the processing results of the previous step.

In one embodiment, a residual refers to the difference between an actual observed value and an estimated value (fitting value), and the residual can be regarded as the observed value of an error.

Step S104: Obtain second audio information corresponding to an i-th segment based on the first audio information corresponding to the i-th segment and the residual values corresponding to the first to (i−1)-th segment. A synthesized audio of the text to be processed includes each of the second audio information.

In one embodiment, i=1, 2 . . . n, n is a total number of the segments. The synthesized audio of text to be processed includes ii second audio information.

In one embodiment, after the second audio information is obtained, the second audio information can be sent to an audio playback device, and the second audio information can be, played by the audio playback device.

According to the method of the embodiment above, an acoustic feature sequence of the text to be processed is obtained first, and the acoustic feature sequence is then processed by using a non-autoregressive computing model to obtain the first audio information of the text to be processed. The first audio information includes audio corresponding to each segment. The preliminary converted audio of the text to be processed is obtained by using the non-autoregressive computing model, and the processing of the text to be processed by using the non-autoregressive computing model is faster than that by using the autoregressive computing model. The acoustic feature sequence and the first audio information are then processed by using the autoregressive computing, model to obtain a residual value of the audio corresponding to each segment. Based on the first audio information and the residual value, the synthesized audio of the text to be processed is obtained. In the embodiment above, the autoregressive computing model is used to process the first audio information and the acoustic feature sequence to obtain the residual values, and the final audio information is obtained by using the residual values and the first audio information.

Figure 4:
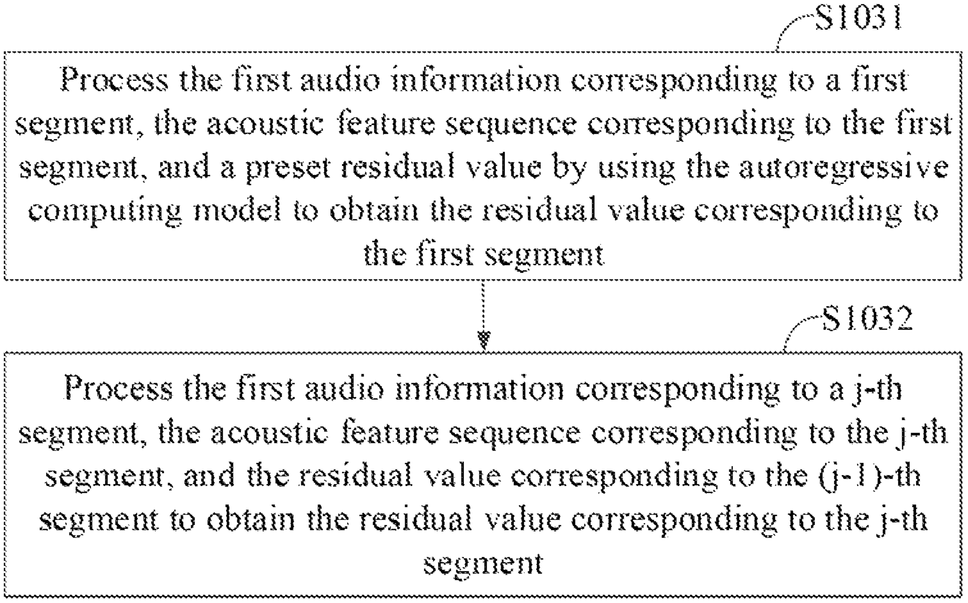
FIG. 4 is an exemplary flowchart of a method for obtaining residual values of first audio information according to another embodiment.

Referring to FIG. 4, in one embodiment, step S103 may include the following steps.

Step S1031: Process the first audio information corresponding to a first segment, the acoustic feature sequence corresponding to the first segment, and a preset residual value by using the autoregressive computing model to obtain the residual value corresponding to the first segment.

In one embodiment, the preset residual value can be set according to actual needs. For example, the preset residual value can be set to 0, 1, and 2.

Specifically, the first audio information corresponding to the first segment, the acoustic feature sequence corresponding to the first segment, and the preset residual value are input into the autoregressive computing model to obtain the residual value corresponding to the first segment.

Step S1032: Process the first audio information corresponding to a j-th segment, the acoustic feature sequence corresponding to the j-th segment, and the residual value corresponding to the (j−1)-th segment to obtain the residual value corresponding to the j-th segment.

In one embodiment, j=2, 3 . . . n.

For example, when j=3, the first audio information corresponding to the third segment, the acoustic feature sequence corresponding to the third segment, and the residual value corresponding to the second segment are processed by the autoregressive computing model to obtain the residual value of the first audio information corresponding to the third segment.

The first audio information corresponding to the j-th segment, the acoustic feature sequence corresponding to the j-th segment, and the residual value corresponding to the (j−1)-th segment are input into the autoregressive computing model to obtain the residual value of the first audio information corresponding to the j-th segment.

According to the embodiment above, the residual value at the previous segment is used to estimate the residual value at the current segment, which can make the obtained residual value at the current segment more accurate.

In one embodiment, step S104 may include the following step: Calculate a sum of the first audio information corresponding to the i-th segment and the residual value corresponding to the i-th segment and use the sum of the first audio information corresponding to the i-th segment and the residual value corresponding to the i-th segment as the second audio information corresponding to the i-th segment.

In one embodiment, the second audio information may be calculated by an audio calculation model described as follows: $T_i=t_i+c_i$, where $T_i$ is the second audio information corresponding to the i-th segment, $t_i$ is the first audio information corresponding to the i-th segment, $c_i$ is the residual value corresponding to the i-th segment.

In one embodiment, the method may include the following step after step S101: perform sampling processing on the acoustic feature sequence to obtain a processed acoustic feature sequence.

In one embodiment, sampling processing includes upsampling processing and downsampling processing. Upsampling refers to the process of interpolating the value according to the values nearby. Downsampling is a multi-rate digital signal processing technique or the process of reducing the sampling rate of a signal, usually to reduce the data transfer rate or data size.

In one embodiment, the processed acoustic feature sequence is processed by using a non-autoregressive computing model to obtain the first audio information of the text to be processed.

When the sampling rate of the acoustic feature sequence is less than a preset sampling rate of the synthesized audio of the text to be processed, upsampling processing is performed on the acoustic feature sequence to obtain the processed acoustic feature sequence based on a ratio of the sampling rate of the acoustic feature sequence to the sampling rate of the synthesized audio of the text to be processed.

In one embodiment, the sampling rate of the synthesized audio of the text to be processed can be set according to actual needs. The sampling rate of the acoustic feature sequence can be set according to actual needs. Specifically, the acoustic feature sequence is sampled according to a preset time window.

When the sampling rate of the acoustic feature sequence is less than a preset sampling rate of the synthesized audio of the text to be processed, the ratio of the sampling rate of the acoustic feature sequence to the sampling rate of the synthesized audio of the text to be processed is calculated. Upsampling processing is performed based on the ratio.

In one embodiment, when the sampling rate of the acoustic feature sequence is greater than the preset sampling rate of the synthesized audio of the text to be processed, downsampling processing is performed on the acoustic feature sequence to obtain the processed acoustic feature sequence based on the ratio of the sampling rate of the acoustic feature sequence to the sampling rate of the synthesized audio of the text to be processed.

It should be understood that sequence numbers of the foregoing processes do not mean an execution sequence in this embodiment of this disclosure. The execution sequence of the processes should be determined according to functions and internal logic of the processes, and should not be construed as any limitation on the implementation processes of this embodiment of this disclosure.

Corresponding to the speech synthesis method described in the embodiment above, FIG. 5 shows a schematic block diagram of a speech synthesis device 200 according to one embodiment. For the convenience of description, only the parts related to the embodiment above are shown.

Referring to FIG. 5, in one embodiment, the device 200 may include a data acquisition module 210, a first model processing module 220, a second model processing module 230 and an audio generation module 240.

In one embodiment, the data acquisition module 210 is to obtain an acoustic feature sequence of a text to be processed. The first model processing module 220 is to process the acoustic feature sequence by using a parallel computing model to obtain first audio information of the text to be processed. The first audio information includes audio corresponding to each sampling moment. The second model processing module 230 is to process the acoustic feature sequence and the first audio information by using a autoregressive computing model to obtain a residual value corresponding to each segment. The audio generation module 240 is to obtain second audio information corresponding to an i-th segment based on the first audio information corresponding to the i-th segment and the residual value corresponding to the i-th segment. The synthesized audio of the text to be processed includes each of the second audio information, i=1, 2 . . . n, n is a total number of the segments.

In one embodiment, the device 200 may further include a sampling module coupled to the data acquisition module 210. The sampling module is to perform sampling processing on the acoustic feature sequence to obtain processed acoustic feature sequence.

In one embodiment, the first model processing module 220 is to process the processed acoustic feature sequence by using the parallel computing model to obtain the first audio information of the text to be processed.

In one embodiment, the sampling module is to, in response to a sampling rate of the acoustic feature sequence being less than a preset sampling rate of the synthesized audio of the text to be processed, perform upsampling processing on the acoustic feature sequence to obtain the processed acoustic feature sequence based on a ratio of the sampling rate of the acoustic feature sequence to the sampling rate of the synthesized audio of the text to be processed.

In one embodiment, the second model processing module 230 is to: process the first audio information corresponding to a first segment, the acoustic feature sequence corresponding to the first segment, and a preset residual value by using the autoregressive computing, model to obtain the residual value corresponding to the first segment, and process the first audio information corresponding to the j-th segment, the acoustic feature sequence corresponding to the j-th segment, and the residual value corresponding to the (j−1)-th segment to obtain the residual value corresponding to the j-th segment, where j=2, 3 . . . n.

In one embodiment, the audio generation module 240 is to calculate a sum of the first audio information corresponding to the i-th segment and the residual value corresponding to the i-th segment, and use the sum of the first audio information corresponding to the i-th segment and the residual value corresponding to the i-th segment as the second audio information corresponding to the i-th segment.

In one embodiment, the audio generation module 240 is to input the text to be processed into an acoustic feature extraction model to obtain the acoustic feature sequence of the text to be processed.

In one embodiment, the sampling module is to, in response to a sampling rate of the acoustic feature sequence being greater than a preset sampling rate of the synthesized audio of the text to be processed, perform downsampling processing on the acoustic feature sequence to obtain the processed acoustic feature sequence based on a ratio of the sampling rate of the acoustic feature sequence to the sampling rate of the synthesized audio of the text to be processed.

It should be noted that the basic principles and technical effects of the device 200 are the same as the aforementioned method. For a brief description, for parts not mentioned in this device embodiment, reference can be made to corresponding description in the method embodiments.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams ma represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent pan, or each of the modules may be independent, or two or more modules may be integrated into one independent part, in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may dearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include an primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing, various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented speech synthesis method, comprising:

obtaining an acoustic feature sequence of a text to be processed;

processing the acoustic feature sequence by using a non-autoregressive computing model in parallel to obtain first audio information of the text to be processed, wherein the first audio information comprises audio corresponding to each segment;

processing the acoustic feature sequence and the first audio information by using an autoregressive computing model to obtain a residual value corresponding to each segment; and obtaining second audio information corresponding to an i-th segment based on the first audio information corresponding to the i-th segment and the residual values corresponding to a first to an (i−1)-th segment, wherein a synthesized audio of the text to be processed comprises each of the second audio information, i=1, 2 . . . n, n is a total number of the segments;

wherein processing the acoustic feature sequence and the first audio information by using the autoregressive computing model to obtain the residual value corresponding to each segment, comprises:

inputting the first audio information corresponding to a first segment, the acoustic feature sequence corresponding to the first segment, and a preset residual value into the autoregressive computing model, to obtain the residual value corresponding to the first segment; and inputting the first audio information corresponding to a j-th segment, the acoustic feature sequence corresponding to the j-th segment, and the residual value corresponding to the (j−1)-th segment into the autoregressive computing model, to obtain the residual value corresponding to the j-th segment, where j=2, 3 . . . n.

2. The method of claim 1, further comprising, after obtaining the acoustic feature sequence of the text to be processed, performing sampling processing on the acoustic feature sequence to obtain a processed acoustic feature sequence; wherein processing the acoustic feature sequence by using the non-autoregressive computing model in parallel to obtain the first audio information of the text to be processed comprises:

processing the processed acoustic feature sequence by using the non-autoregressive computing model to obtain the first audio information of the text to be processed.

3. The method of claim 2, wherein performing sampling processing on the acoustic feature sequence to obtain the processed acoustic feature sequence comprises:

in response to a sampling rate of the acoustic feature sequence being less than a preset sampling rate of the synthesized audio of the text to be processed, performing upsampling processing on the acoustic feature sequence to obtain the processed acoustic feature sequence based on a ratio of the sampling rate of the acoustic feature sequence to the sampling rate of the synthesized audio of the text to be processed.

4. The method of claim 2, wherein performing sampling processing on the acoustic feature sequence to obtain the processed acoustic feature sequence comprises:

in response to a sampling rate of the acoustic feature sequence being greater than a preset sampling rate of the synthesized audio of the text to be processed, performing downsampling processing on the acoustic feature sequence to obtain the processed acoustic feature sequence based on a ratio of the sampling rate of the acoustic feature sequence to the sampling rate of the synthesized audio of the text to be processed.

5. The method of claim 1, wherein obtaining second audio information corresponding to an i-th segment based on the first audio information corresponding to the i-th segment and the residual value corresponding to the i-th segment, comprises:

calculating a sum of the first audio information corresponding to the i-th segment and the residual value corresponding to the i-th segment; and using the sum of the first audio information corresponding to the i-th segment and the residual value corresponding to the i-th segment as the second audio information corresponding to the i-th segment.

6. The method of claim 1, wherein obtaining the acoustic feature sequence of the text to be processed comprises:

inputting the text to be processed into an acoustic feature extraction model to obtain the acoustic feature sequence of the text to be processed.

7. A speech synthesis device comprising:

one or more processors; and a memory coupled to the one or more processors, the memory storing programs that, when executed by the one or more processors, cause performance of operations comprising:

obtaining an acoustic feature sequence of a text to be processed;

processing the acoustic feature sequence by using a non-autoregressive computing model in parallel to obtain first audio information of the text to be processed, wherein the first audio information comprises audio corresponding to each segment;

processing the acoustic feature sequence and the first audio information by using an autoregressive computing model to obtain a residual value corresponding to each segment; and obtaining second audio information corresponding to an i-th segment based on the first audio information corresponding to the i-th segment and the residual values corresponding to a first to an (i−1)-th segment, wherein a synthesized audio of the text to be processed comprises each of the second audio information, i=1, 2 . . . n, n is a total number of the segments;

wherein processing the acoustic feature sequence and the first audio information by using the autoregressive computing model to obtain the residual value corresponding to each segment, comprises:

inputting the first audio information corresponding to a first segment, the acoustic feature sequence corresponding to the first segment, and a preset residual value into the autoregressive computing model, to obtain the residual value corresponding to the first segment; and inputting the first audio information corresponding to a j-th segment, the acoustic feature sequence corresponding to the j-th segment, and the residual value corresponding to the (j−1)-th segment into the autoregressive computing model, to obtain the residual value corresponding to the j-th segment, where j=2, 3 . . . n.

8. The speech synthesis device of claim 7, wherein the operations further comprise, after obtaining the acoustic feature sequence of the text to be processed, performing sampling processing on the acoustic feature sequence to obtain a processed acoustic feature sequence; wherein processing the acoustic feature sequence by using the non-autoregressive computing model in parallel to obtain the first audio information of the text to be processed comprises:

processing the processed acoustic feature sequence by using the non-autoregressive computing model to obtain the first audio information of the text to be processed.

9. The speech synthesis device of claim 8, wherein performing sampling processing on the acoustic feature sequence to obtain the processed acoustic feature sequence comprises:

in response to a sampling rate of the acoustic feature sequence being less than a preset sampling rate of the synthesized audio of the text to be processed, performing upsampling processing on the acoustic feature sequence to obtain the processed acoustic feature sequence based on a ratio of the sampling rate of the acoustic feature sequence to the sampling rate of the synthesized audio of the text to be processed.

10. The speech synthesis device of claim 8, wherein performing sampling processing on the acoustic feature sequence to obtain the processed acoustic feature sequence comprises:

in response to a sampling rate of the acoustic feature sequence being greater than a preset sampling rate of the synthesized audio of the text to be processed, performing downsampling processing on the acoustic feature sequence to obtain the processed acoustic feature sequence based on a ratio of the sampling rate of the acoustic feature sequence to the sampling rate of the synthesized audio of the text to be processed.

11. The speech synthesis device of claim 7, wherein obtaining second audio information corresponding to an i-th segment based on the first audio information corresponding to the i-th segment and the residual value corresponding to the i-th segment, comprises:

calculating a sum of the first audio information corresponding to the i-th segment and the residual value corresponding to the i-th segment; and using the sum of the first audio information corresponding to the i-th segment and the residual value corresponding to the i-th segment as the second audio information corresponding to the i-th segment.

12. The speech synthesis device of claim 7, wherein obtaining the acoustic feature sequence of the text to be processed comprises:

inputting the text to be processed into an acoustic feature extraction model to obtain the acoustic feature sequence of the text to be processed.

13. A non-transitory computer-readable storage medium storing instructions that, when executed by at least one processor of a speech synthesis device, cause the at least one processor to perform a speech synthesis method, the method comprising:

obtaining an acoustic feature sequence of a text to be processed;

processing the acoustic feature sequence by using a non-autoregressive computing model in parallel to obtain first audio information of the text to be processed, wherein the first audio information comprises audio corresponding to each segment;

processing the acoustic feature sequence and the first audio information by using an autoregressive computing model to obtain a residual value corresponding to each segment; and obtaining second audio information corresponding to an i-th segment based on the first audio information corresponding to the i-th segment and the residual values corresponding to a first to an (i−1)-th segment, wherein a synthesized audio of the text to be processed comprises each of the second audio information, i=1, 2 . . . n, n is a total number of the segments;

wherein processing the acoustic feature sequence and the first audio information by using the autoregressive computing model to obtain the residual value corresponding to each segment, comprises:

inputting the first audio information corresponding to a first segment, the acoustic feature sequence corresponding to the first segment, and a preset residual value into the autoregressive computing model, to obtain the residual value corresponding to the first segment; and inputting the first audio information corresponding to a j-th segment, the acoustic feature sequence corresponding to the j-th segment, and the residual value corresponding to the (j−1)-th segment into the autoregressive computing model, to obtain the residual value corresponding to the j-th segment, where j=2, 3 . . . n.

14. The non-transitory computer-readable storage medium of claim 13, further comprising, after obtaining the acoustic feature sequence of the text to be processed, performing sampling processing on the acoustic feature sequence to obtain a processed acoustic feature sequence; wherein processing the acoustic feature sequence by using the non-autoregressive computing model in parallel to obtain the first audio information of the text to be processed comprises:

processing the processed acoustic feature sequence by using the non-autoregressive computing model to obtain the first audio information of the text to be processed.

15. The non-transitory computer-readable storage medium of claim 14, wherein performing sampling processing on the acoustic feature sequence to obtain the processed acoustic feature sequence comprises:

in response to a sampling rate of the acoustic feature sequence being less than a preset sampling rate of the synthesized audio of the text to be processed, performing upsampling processing on the acoustic feature sequence to obtain the processed acoustic feature sequence based on a ratio of the sampling rate of the acoustic feature sequence to the sampling rate of the synthesized audio of the text to be processed.

16. The non-transitory computer-readable storage medium of claim 14, wherein performing sampling processing on the acoustic feature sequence to obtain the processed acoustic feature sequence comprises:

in response to a sampling rate of the acoustic feature sequence being greater than a preset sampling rate of the synthesized audio of the text to be processed, performing downsampling processing on the acoustic feature sequence to obtain the processed acoustic feature sequence based on a ratio of the sampling rate of the acoustic feature sequence to the sampling rate of the synthesized audio of the text to be processed.

17. The non-transitory computer-readable storage medium of claim 13, wherein obtaining second audio information corresponding to an i-th segment based on the first audio information corresponding to the i-th segment and the residual value corresponding to the i-th segment, comprises:

calculating a sum of the first audio information corresponding to the i-th segment and the residual value corresponding to the i-th segment; and using the sum of the first audio information corresponding to the i-th segment and the residual value corresponding to the i-th segment as the second audio information corresponding to the i-th segment.

18. The non-transitory computer-readable storage medium of claim 13, wherein obtaining the acoustic feature sequence of the text to be processed comprises:

inputting the text to be processed into an acoustic feature extraction model to obtain the acoustic feature sequence of the text to be processed.

19. The non-transitory computer-readable storage medium of claim 13, wherein the acoustic feature sequence of the text to be processed is obtained by using an acoustic feature extraction model; and wherein the acoustic feature extraction model includes a convolutional neural network model or a recurrent neural network, and the acoustic feature sequence may include a Mel spectrogram or a Mel-scale Frequency Cepstral Coefficients.

20. The non-transitory computer-readable storage medium of claim 13, wherein the first audio information is a combination of audio segments predicted by the non-autoregressive model in parallel, and the audio segments are defined as single words, or sub-sequences of words that have similar character lengths.

* * * * *